United States Patent [19]

Blue

[11] 4,055,687
[45] Oct. 25, 1977

[54] BATTERY TERMINAL POST CLEANER

[76] Inventor: Maurice R. Blue, 60960 Crown Court, South Bend, Ind. 46614

[21] Appl. No.: 652,501

[22] Filed: Jan. 26, 1976

[51] Int. Cl.² ............................................. B23P 7/00
[52] U.S. Cl. .................................. 427/142; 427/140; 427/421; 429/49; 429/65
[58] Field of Search ........................... 134/26, 30, 42; 136/135 S, 155, 181, 163, 174; 427/140, 142, 421; 429/49, 65

[56] References Cited

U.S. PATENT DOCUMENTS

| 1,558,589 | 10/1925 | Canute | 136/163 X |
| 1,565,994 | 12/1925 | Franklin | 136/163 X |
| 1,610,703 | 12/1926 | Olson | 136/163 X |
| 1,904,954 | 4/1933 | Schmuhl | 136/135 S X |
| 2,159,854 | 5/1939 | Jourdan et al. | 136/136 |
| 3,224,906 | 12/1965 | Deibel et al. | 136/135 S X |
| 3,494,794 | 2/1970 | Hittel | 134/30 X |
| 3,661,642 | 5/1972 | Pisaturo | 136/163 X |

FOREIGN PATENT DOCUMENTS 2,209,248  9/1973  Germany

Primary Examiner—Ronald H. Smith
Assistant Examiner—Shrive P. Beck
Attorney, Agent, or Firm—Blanchard, Flynn, Thiel, Boutell & Tanis

[57] ABSTRACT

The posts of electrical storage batteries are treated with an aerosol of a halogenated hydrocarbon propellant and mineral oil to remove oily residues and corrosion scale therefrom and to protect the posts against reappearance of scale and corrosion thereon.

1 Claim, No Drawings

BATTERY TERMINAL POST CLEANER

BACKGROUND OF THE INVENTION

1. Field of the Invention

This invention relates to a method for removing oily residues and corrosion scale from the terminals, sometimes called the posts, of electrical storage batteries or electric accumulators, particularly automotive storage batteries, and protecting such terminals for a relatively long period of time against the reappearance of residues and corrosion thereon.

2. Description of the Prior Art

It is well known that, during use, a crust or scale of acidic corrosion products forms on the terminals of storage batteries, particularly in motor vehicles. The crust or scale has coated thereon or combined therewith oily residues, road dirt, etc., which act in the nature of an adhesive so that the corrosion products and oily residues remain stuck to the terminals as an adherent coating or layer thereon. This coating interferes with the proper electrical connection of the posts to the electrical cables that carry the electrical energy to the load device, and it must be removed from time to time. Various treatments are known for removing this coating. For example, the crust can be removed by mechanical scrapers or it can be treated with various chemicals that dissolve or wash off the crust. These treatments are inconvenient and sometimes difficult or risky to perform, and they do not protect the posts against the reappearance of corrosion thereon, which can happen in a short time. Thus, the prior treatments are not convenient to perform and the results are not fully satisfactory. It is also known to protect the clean posts against corrosion by applying thereon a film of a hydrocarbon, such as grease.

SUMMARY OF THE INVENTION

Accoringly, it is an object of this invention to provide an improved method for treating the posts or terminals of storage batteries by spraying thereon a composition that is effective to dissolve and remove the oily residues and to free the corrosion products from the posts, and to leave deposited on the posts a protective film to prevent the reappearance of crust for a prolonged period of time.

According to the invention there is employed an aerosol composition consisting essentially of (A) an odorless, noncorrosive, nontoxic, nonirritating, nonexplosive, nonflammable, liquified, halogenated hydrocarbon propellant capable of dissolving the hydrocarbon oily residues that adhere to battery terminal posts and (B) a hydrocarbon mineral oil.

The propellant can be selected from among the known halogenated hydrocarbons conventionally used as propellants in aerosol spray preparations, typical ones of which are $CCl_3F$, $CCl_2F_2$, $CHCl_2F$, $CHClF_2$, $CH_2Cl_2$, $CClF_2$-$CClF_2$, $CCl_2FCF_3$, $CClF_2CH_3$, $CHF_2CH_3$, $CH_3CH_2Cl$, octafluorocyclobutane and decafluorobutane.

The mineral oil is selected from known commercially available materials commonly known as white mineral oil and technical white mineral oil, which conventionally have a specific gravity in the range of 0.828 to 0.895 at 60° F, a Saybolt viscosity of from 50 to 355 at 100° F and a pour point from 0° to 20° F. It is preferred to use mineral oils having a Saybolt viscosity of from 200 to 355 at 100° F.

The two ingredients are mixed in suitable proportions so that they form a homogeneous liquid solution in which the mineral oil is mutually miscible in the liquified propellant. The composition is employed in the form of an aerosol pressure package in which a homogeneous miscible mixture of the mineral oil and the liquified propellant gas, under pressure, can be dispensed in the form of a liquid aerosol spray by opening a valve. The proportions of the ingredients are variable and are selected to provide a coating spray application of the propellant-mineral oil solution onto the battery posts. In general, the weight ratio of mineral oil/liquified propellant gas is from ½ to 10/1, preferably about 1/1 to 2/1. As is well known, in the aerosol pressure package, the internal dispensing pressure is provided by a vapor phase of the propellant which has, for example, a pressure of about 15 to 100 psig at 70° F.

When the liquified propellant/mineral oil aerosol spray is directed against a corroded battery terminal, there is observed an immediate frothing or foaming action on the terminal which subsides in a few moments. Simultaneously there occurs dissolving of the oily residue on the terminal. The acidic corrosion material does not appear to be dissolved, but rather becomes transformed to a relatively dry powder that is loosened from and mostly drops off the terminal. This powder can be removed by brushing, if needed. The dispensing pressure of the aerosol spray promotes the cleaning operation and the frothing of the sprayed-on liquid has a similar promoting action by penetrating the crust to cause it to break or flake off the post. Although it is to be understood that the invention is not to be limited to any specific theory of operation, it is believed that the propellant gas dissolves or liquifies the oily residue so that it will flow and/or be blown off the battery post. The frothing is caused by evaporation of the propellant. This action plus the cooling action caused by evaporation of the propellant has the effect of loosening corrosion products that are not dissolved by the propellant. The mineral oil may also have some effect of dissolving the oily residue on the battery terminal, but this appears to be minor in comparison to the dissolving effect of the propellant.

Thus, within a short time after application of the liquified propellant/mineral oil liquid, the battery terminal becomes clean and shiny. The propellant is substantially completely vaporized. The mineral oil remains as a protective coating film on the terminal. Tests have shown that corrosion does not reappear thereon for at least sixty days.

The two miscible ingredients, that is, the liquified propellant and mineral oil, provide an advantageous cooperative combined effect that neither ingredient alone provides.

The above-described foaming action is believed not to be caused by reaction with the battery post corrosion, per se, because the corrosion product after spraying does not appear to be chemically different from the corrosion product prior to spraying. It is believed, rather, that the foaming action is the result of a surface tension phenomenon caused when minute quantities of the propellant escape from the non-volatile mineral oil when in contact with the oily residue.

The amount of the liquified propellant/mineral oil liquid that is sprayed on the battery post will be selected, in the user's judgment, to obtain substantially complete removal of the corrosion and oily residue. Typically, a spraying time of 2 to 4 seconds is adequate.

The spraying is carried out so that a more or less uniform coating film of the liquid is applied to the entirety of the battery post. If needed, application of the liquid can be repeated. Because the propellant volatilizes rapidly and because the mineral oil is chemically inert, the battery case is not detrimentally affected by the treatment according to the invention.

Thus, the invention provides a facile, safe method of removing oily residue and corrosion from battery posts and to protect the posts again the rapid reappearance of corrosion thereon.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of treating a corroded terminal post of an electrical storage battery wherein a coating layer of corrosion products and oily residues adheres to said post, which comprises, spraying onto said coating layer of said terminal post an aerosol of a mixture consisting essentially of a liquefied halogenated hydrocarbon propellant and non-volatile mineral oil, said aerosol being sprayed from an aerosol pressure package under an internal pressure of a vapor phase of said propellant, said aerosol spray being deposited as a coating film on said coating layer and said propellant foams and evaporates while in contact with said layer and thereby removes the oily residues from said coating layer and transforms said corrosion products to a powder whereby said post becomes clean and said mineral oil remains as a corrosion-resistant coating on said post.

* * * * *